(12) United States Patent
Lehmann et al.

(10) Patent No.: US 10,216,702 B2
(45) Date of Patent: Feb. 26, 2019

(54) MACHINE FOR DIGITAL IMPACT MATRIX DEVELOPMENT

(71) Applicant: Accenture Global Solutions Limited, Dublin (IE)

(72) Inventors: Silke Lehmann, Brokstedt (DE); Ankur Saxena, Gurgaon (IN)

(73) Assignee: Accenture Global Solutions Limited, Dublin (IE)

( * ) Notice: Subject to any disclaimer, the term of this patent is extended or adjusted under 35 U.S.C. 154(b) by 129 days.

(21) Appl. No.: 15/350,875

(22) Filed: Nov. 14, 2016

(65) Prior Publication Data

US 2017/0199846 A1 Jul. 13, 2017

(30) Foreign Application Priority Data

Jan. 13, 2016 (IN) .............................. 201641001199

(51) Int. Cl.
*G06F 17/16* (2006.01)
*G06Q 10/06* (2012.01)

(52) U.S. Cl.
CPC ............. *G06F 17/16* (2013.01); *G06Q 10/06* (2013.01)

(58) Field of Classification Search
CPC ................................ G06F 17/16; G06Q 10/06
USPC ........................................................ 708/490
See application file for complete search history.

(56) References Cited

U.S. PATENT DOCUMENTS

| 7,813,947 B2 | 10/2010 | DeAngelis et al. |
| 8,645,194 B1 | 2/2014 | Lehmann et al. |
| 2004/0163020 A1* | 8/2004 | Sidman ............. H04L 29/12047 714/100 |
| 2005/0065807 A1 | 3/2005 | Deangelis et al. |
| 2013/0145319 A1* | 6/2013 | Wein .................. G06Q 30/0603 715/811 |

OTHER PUBLICATIONS

Australian Patent Office, Examination Report No. 4 for Australian Patent Application No. 2016269470 dated Feb. 16, 2018, pp. 1-4.
Patent Examination Report No. 2 corresponding to Australian Patent Application No. 2016269470, dated Jul. 4, 2017, 3 pages.
Patent Examination Report No. 1 corresponding to Australian Patent Application No. 2016269470, dated Feb. 16, 2017, 5 pages.
Australian Patent Office, Examination Report No. 3 for Australian Patent Application No. 2016269470 dated Nov. 23, 2017, 5 pages.
Office Action in Canada application No. 2,951,308, dated Oct. 31, 2018, pp. 1-6.

* cited by examiner

*Primary Examiner* — Tan V Mai
(74) *Attorney, Agent, or Firm* — Brinks Gilson & Lione (57) ABSTRACT

A machine generates and provides a digital impact matrix including a first matrix and, in some embodiments, a second matrix, the first matrix including a plurality of impacts that various digital technologies have on various organizational processes. In some embodiments, the first matrix includes a plurality of magnitudes of impacts, while the second matrix includes a plurality of business values of impact that the various digital technologies have on the various organizational processes. A user interface is provided to assign impact categorizations to the impacts and of the first matrix and the second matrix, if applicable, and to display a graphical representation of the digital impact matrix.

20 Claims, 8 Drawing Sheets

MACHINE FOR DIGITAL IMPACT MATRIX DEVELOPMENT

CROSS-REFERENCE TO RELATED APPLICATIONS

This application claims priority to Indian Provisional Patent Application No. 201641001199, filed Jan. 13, 2016, titled "Machine for Digital Impact Matrix Development," the contents of which is incorporated herein by reference in its entirety.

TECHNICAL FIELD

This disclosure relates to machines and complex system architectures for developing and utilizing impact matrices for digital technologies.

BACKGROUND

The technological world around business organizations has changed dramatically over the past few years. For example, IT solution providers have developed and provided many digital technology innovations in the marketplace for use by business organizations. Each of these digital technologies may or may not provide value to a particular business organization or address the needs of a business organization. Further, many of these digital technologies have costs associated their use (e.g., licensing fees) or in initial investments to implement the digital technologies. These costs may limit carte blanche implementation of these digital technologies and innovations requiring business organizations to carefully select which digital technologies to implement.

DETAILED DESCRIPTION

Organizations, such as business organizations, across various industries may implement a variety of organizational processes to accomplish various goals of the business organization. A "Process" may refer to a way of executing any capability of the organization to achieve a result. Organizational processes may also be referred to as "capabilities." At present, many organizational processes can be implemented utilizing digital technologies such as a digital tool or digital service or a collection of digital tools and/or services. Business organizations may select various digital technologies to implement without fully recognizing the magnitude of impact or business value such implementation may have on one or more of their organizational processes. Implementation of these digital technologies often involves substantial costs, either in operation of these digital technologies (e.g., licensing costs, service provider costs, hardware platforms, personnel, etc.) and/or in costs to begin implementation (e.g., integration, data conversion, training, etc.). Example digital technologies include, but are in no way limited to, social media, mobility, analytics/big data, and cloud services. Many other digital technologies may be possible and are fully contemplated by this disclosure.

A business organization may have thousands of organizational processes. Such a business organization may require a basis or criteria for selecting which organizational processes to apply digital technologies to. Similarly, digital technologies may compete for scarce budgets within a business organization, and as such, the selected digital technologies should generate business value. Thus, a technical challenge exists in determining and communicating the impact of implementing digital technologies on various organizational processes. As is discussed at greater length below, and in accordance with various embodiments, one technical solution includes the generation and provision of a digital impact matrix that can help business organizations understand the impact of implementing digital technologies on its multiple organizational processes. Similarly, the digital impact matrix can help business organizations prioritize which digital technologies have a high impact on strategically important organizational processes. With the generation of a digital impact matrix, a business organization can easily and confidently select which digital technologies to implement or which organizational processes to digitize with knowledge of how such implementation will affect multiple organizational processes, both in terms of a magnitude of impact as well as a business value of impact.

Figure 1:
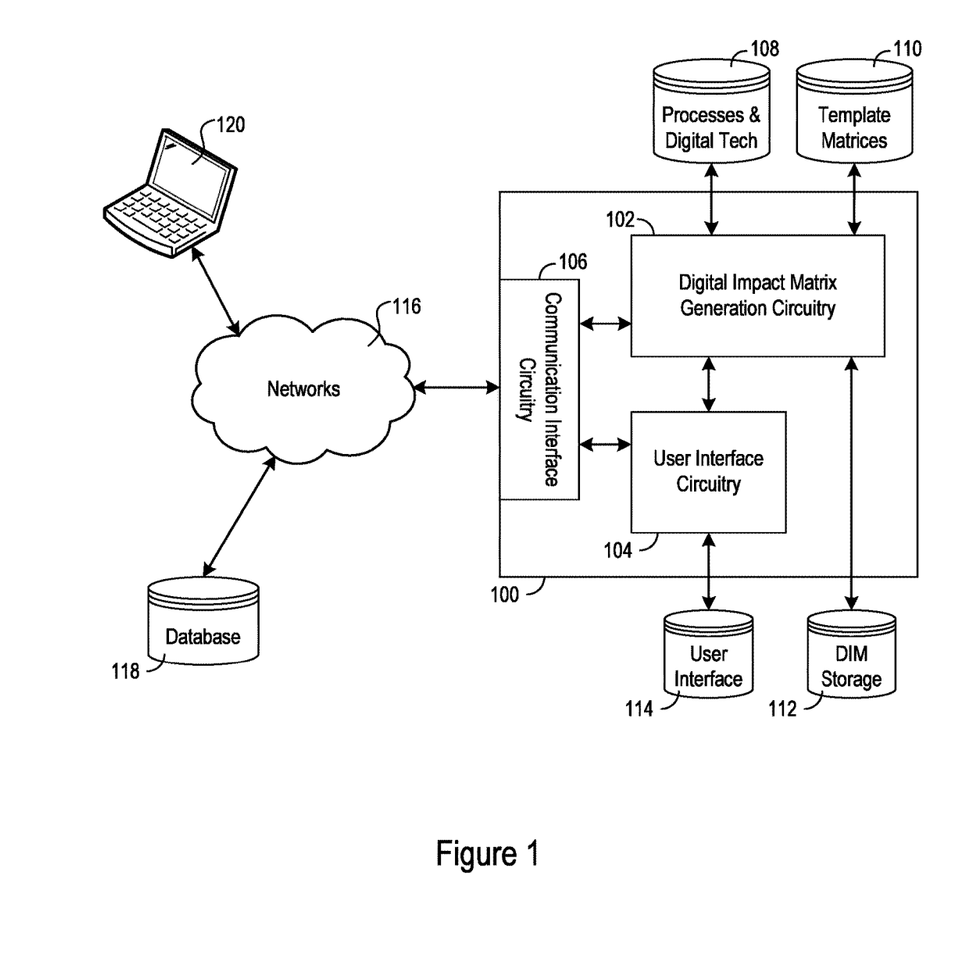
FIG. 1 shows an example contextual setting and block diagram of a machine for generating digital impact matrices.

FIG. 1 illustrates an example contextual setting and block diagram of a machine 100 for generating digital impact matrices ("DIM"). The machine 100 may include digital impact matrix generation circuitry (DIM generation circuitry) 102, user interface circuitry 104, and communication interface circuitry 106. The DIM generation circuitry 102 is coupled to the user interface circuitry 104 and the communication interface circuitry 106, while the user interface circuitry 104 is also coupled to the communication interface circuitry 106. The machine 100, and in particular, the DIM generation circuitry 102 may be coupled to various databases, including, for example, an organizational database 108, which may store sets of organizational processes arranged in logical orders (e.g., in one or more Logical Organization Model, or LOM). This information may be input into the organizational database 108 as part of other procedures involved in the management and arrangement of the business organization. Similarly, the organizational database 108, or another database, may include sets or lists of possible digital technologies that can be utilized by the organization, for example, according to the organizational processes. For example, a larger inclusive list of digital technologies can be narrowed down to a smaller set of digital technologies as may be appropriate for a certain given set of organizational processes.

The DIM generation circuitry 102 may also be coupled to a template matrices database 110 in which are stored one or more DIM templates. The DIM generation circuitry 102 may also be coupled to a DIM storage database 112 in which are stored one or more completed or in-process DIMs. The user interface circuitry 104 may be coupled to a user interface database 114, which may store logic, instructions, code, images, or other content necessary to generate and provide a user interface, and in particular, a graphical user interface (GUI). The organizational database 108, the template matrices database 110, the DIM storage database 112, and the user interface database 114 may be implemented on multiple distinct storage devices (e.g., memories or hard drives), on a single storage device, or on a combination thereof. For example, some storage databases may be implemented on a common shared storage device, while other storage databases may be implemented on other distinct storage devices. These storage devices may be local to the machine 100, for example, housed within the machine 100 or directly connected to the machine. Alternatively, the storage devices, for example, remote database 118, may be connected to the machine 100 over networks 116 such as an intranet (e.g., local) or via the Internet.

The machine 100 may be coupled to one or more networks 116, which may include the Internet or an intranet. Other devices and/or system may also be connected to the networks 116, including, for example, one or more client devices 120. The client device 120 may include, for example, a computer (e.g., laptop), a smartphone, or another electronic device capable of communicating with the machine 100 via the networks 116 or directly. The client device 120 may be a computing device which allows a user to connect to a network 116, such as the Internet. Examples of a client device 120 include, but are not limited to, a personal computer, personal digital assistant ("PDA"), a laptop, a smartphone, a cellular phone, a tablet, or another electronic device. The client device 120 may include a keyboard, keypad, a touch screen interface, or a cursor control device, such as a mouse, or a joystick, a display device, a remote control, and/or any other device operative to view and interact with a user interface. In one embodiment, the user device 120 is configured to request and receive information from the networks 116, for example, using a web browser, such as INTERNET EXPLORER® (sold by Microsoft Corp., Redmond, Wash.) or FIREFOX® (provided by Mozilla). Alternatively, the client device 120 may couple directly to the machine 100 (e.g., via a direct connection or via a local intranet). In another embodiment, the client device 120 and the machine 100 are implemented on the same system, e.g., on a laptop or other computing device. Further technical operational details of the machine 100 are provided below.

Figure 2:
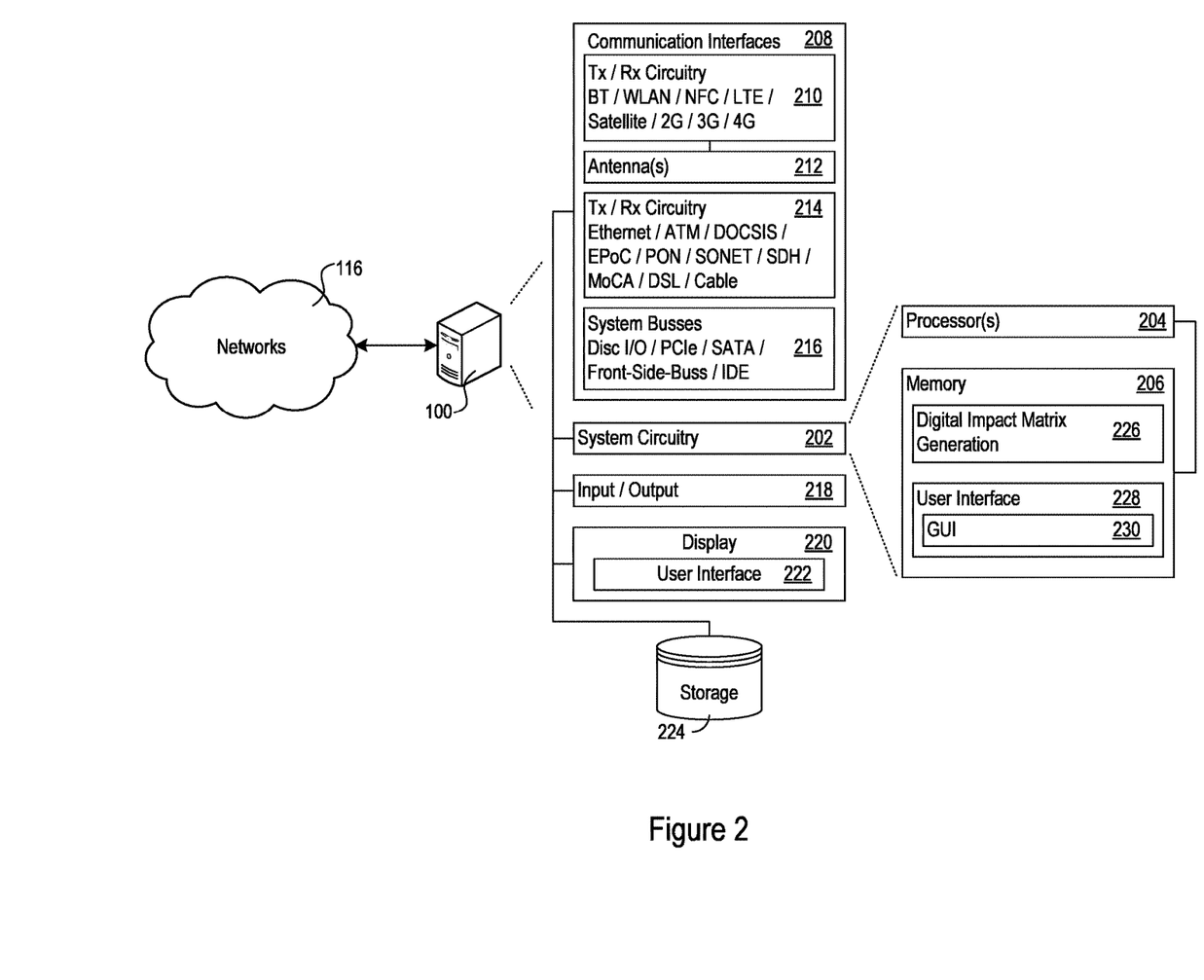
FIG. 2 shows an example specific system implementation for the machine.

FIG. 2 shows an example specific system implementation 200 for the machine 100. According to the system implementation 200, the machine 100 includes system circuitry 202 to support implementation of the various circuitry elements and functionality discussed above with respect to FIG. 1 and elsewhere. In one embodiment, the system circuitry 202 includes processors 204, memory 206, and/or other circuitry. The processors 204 may be connected to the memory 206 and may comprise a memory system including a plurality of memory devices collocated or distributed across multiple systems. The memory 206 may store control instructions, operational parameters for the control instructions, datasets, and other information. The control instructions may be executed by the processor 204 to implement any of the processing described below, according to a configuration set by the operational parameters. Further, in some embodiments, various circuitry elements of the machine 100 may be implemented by the system circuitry 202. For example, the DIM generation circuitry 102, the user interface circuitry 104, and/or the communication interface circuitry 106, may be implemented in whole or in part by one or more instances of the system circuitry 202.

The memory 206 may store data and instructions for use by the circuitry elements and/or to implement portions of the circuitry elements. In one embodiment, the memory 206 includes DIM generation instructions 226. The processors 204, memory 206, and DIM generation instructions 226 may implement portions of the DIM generation circuitry 102 shown in FIG. 1. Similarly, the memory 206 may include user interface instructions 228, which may further include graphical user interface (GUI) instructions and data 230. The processors 204, memory 206, user interface instructions 228 and GUI instructions and data 230 may implement portions of the user interface circuitry 104 shown in FIG. 1.

The machine 100 may also include communication interfaces 208, which may support wireless communication via wireless communication circuitry 210 and antennas 212. Example wireless communication protocols may include Bluetooth, Wi-Fi, WLAN, near field communication protocols, cellular protocols (2G, 3G, 4G, LTE/A), and/or other wireless protocols. Also, communication interface 208 may include wired communication circuitry 214. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax affiance (MoCA) protocols, digital subscriber line (DSL) protocols, cable communication protocols, and/or other networks and network protocols. The communication interfaces 208 may be connected or configured to connect to the networks 116, including the Internet or an intranet, to enable the machine 100 and the system circuitry 202 therein to communicate with other systems and devices. Additionally, the communication interface 208 includes system buses 216 to effect intercommunication between various elements, components, and circuitry portions of the machine 100. Example system bus implementations include PCIe, SATA, and IDE based buses.

The communication interfaces 208 may enable interconnection of various circuitry components illustrated in FIG. 1 within the machine 100 (e.g., via one or more buses, computer component interfaces, or peripheral component interfaces). For example, the communication interfaces 208 may couple to the DIM generation circuitry 102 and the user interface circuitry 104. Further, the communication interfaces 208 may couple to the organizational database 108, the template matrices database 110, the DIM storage database 112, and the user interface database 114 internally via system busses 216 if internally maintained, or externally via the wireless communication circuitry 210 or the wired communication circuitry 214 if externally maintained. The communication interfaces 208 may also support communication with remote storage database 118.

The communication interfaces 208 may support communication with external client devices 120. Communication with the external client devices 120 may be effected through user interface circuitry 104 and/or with user interface instructions 228. A dynamically reconfigurable GUI may be provided to the external client devices 120 via the networks 116 to enable interaction between the client devices 120 and the machine 100. In one example, the machine 100 comprises a web server capable of providing web services or web pages to the client device 120.

In some embodiments, the machine 100 may itself include various I/O interfaces 218 and/or a display 220, for example, to enable local interaction with the various circuitry elements discussed above instead of or in addition to interaction over the networks 116 with a remote client device 120. In some examples, the display device 220 can provide a user interface 222 to a local user, which can be the same as or a variation of a user interface that can be provided to a remote client device 120 (discussed below).

Additionally, the I/O interfaces 218 and display 220 may enable local maintenance engineers to interact with the machine 100. A local GUI may be provided via the local display 220 to present a control dashboard, actionable insights and/or other information to a maintenance engineer. The local GUI may support portable access, such as, via a web-based GUI, to enable maintenance on the machine 100 or other interaction with the machine 100. This local GUI may be the same as or different from the GUI described elsewhere. The machine 100 may also include a storage drive 224 (e.g., a hard drive, solid-state drive, or other memory system) to enable local storage of system software, user interfaces, or system instructions.

Figure 3:
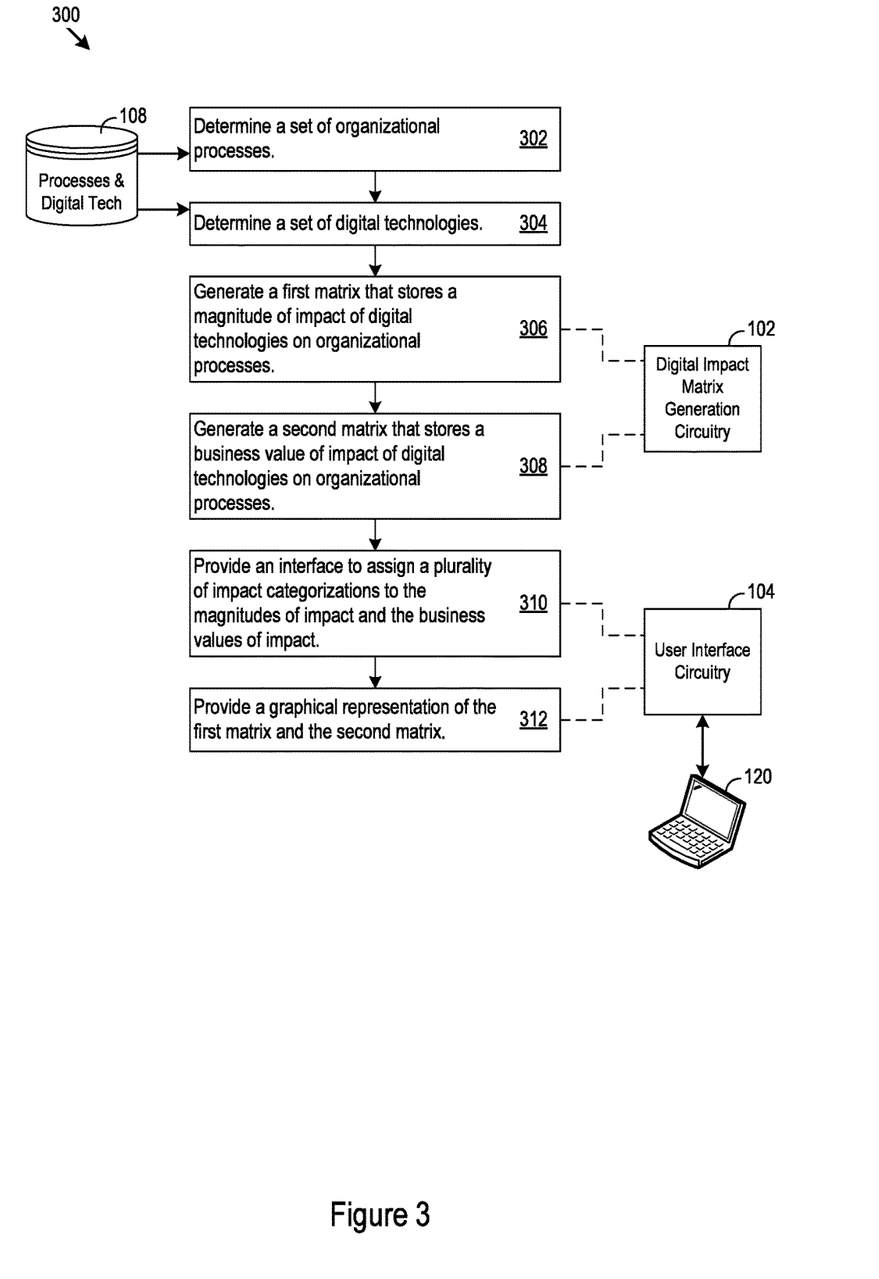
FIG. 3 shows a flow diagram of logic that the machine may implement.
Figure 4:
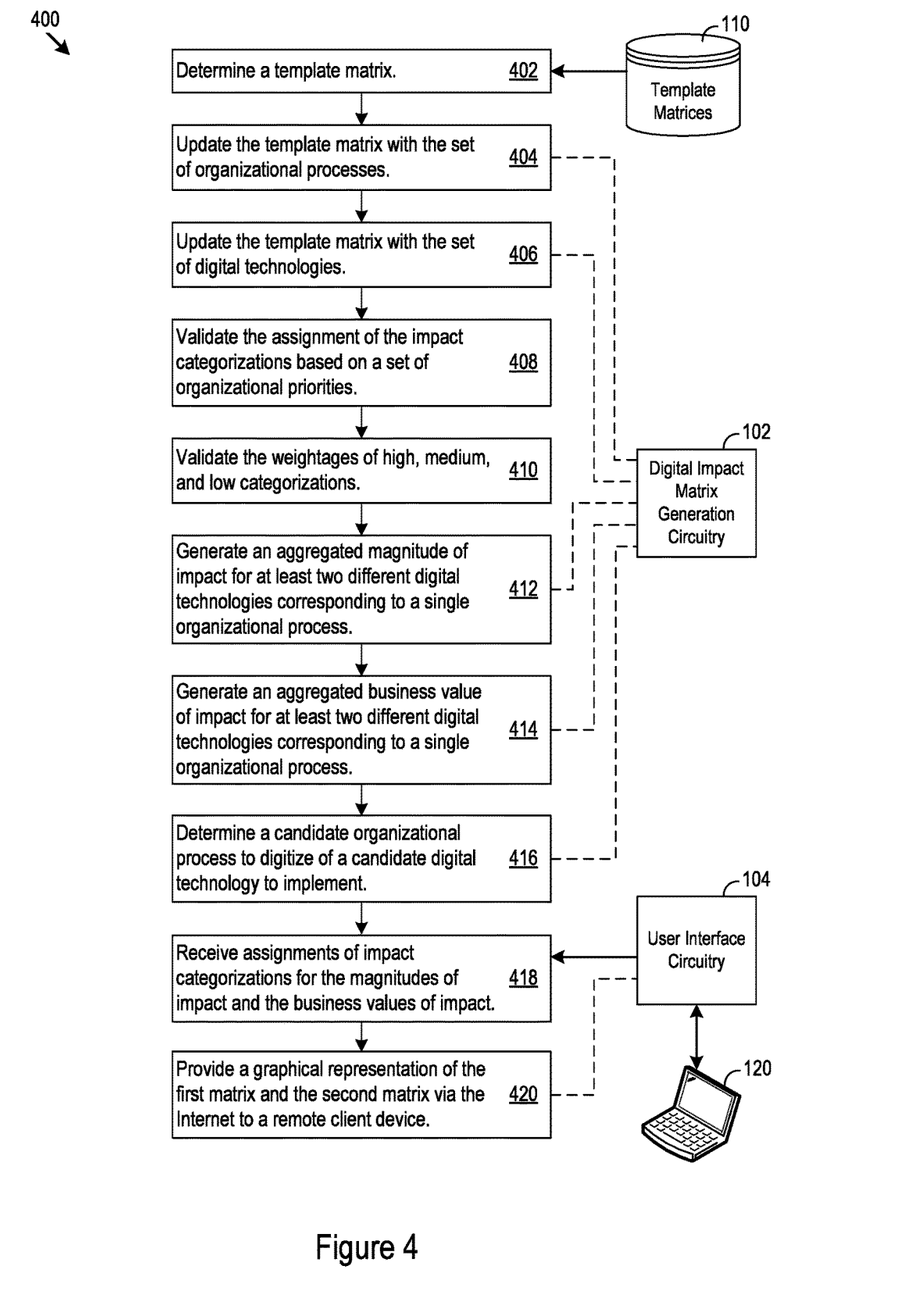
FIG. 4 shows another flow diagram of logic that the machine may implement.

Operations of the machine 100 and its various circuitry elements are described with simultaneous reference to FIG. 2 and FIGS. 3-4. FIG. 3 shows a flow diagram of logic 300 that the machine 100 may implement to generate a digital impact matrix. For instance, the DIM generation circuitry 102 and/or the user interface circuitry 104 may be configured to implement some or all of the logic 300 shown in FIG. 3. The DIM generation circuitry 102 may determine a set of organizational processes executed by an organization (302). For example, the DIM generation circuitry 102 may communicate with the organizational database 108 to retrieve a list or set of organizational processes implemented by the organization. This may include the DIM generation circuitry 102 receiving a Logical Operating Model (LOM) that includes some or all of the processes that the organization implements.

The DIM generation circuitry 102 may determine a set of possible digital technologies which may be utilized by the organization (304). For example, the set or list of possible digital technologies may include digital technologies that are commonly implemented within a particular industry or within the broader arena of general business. The set of digital technologies may be a list of digital technology offerings by a company (e.g., a business consulting company and/or any of its affiliates), or may be a list of any and all known digital technology offerings. The list may be narrowed down to only digital technologies that are appropriate for a given industry, or may be represented with broad categories (e.g., social media, mobility, analytics, and/or cloud services).

The DIM generation circuitry 102 may then generate a digital impact matrix. In one embodiment, the DIM generation circuitry 102 generates a first matrix. The first matrix is a rectangular array of values, expressions, categories, or other elements or entries arranged in rows and columns. The first matrix places the set of organizational processes against (or versus) the set of digital technologies. The elements of the first matrix (e.g., the intersections for each individual organizational process with each individual digital technology) collectively store a plurality of impacts. In one approach, the plurality of impacts is a plurality of magnitudes of impact, which measure the magnitude of impact that an individual digital technology will have on an individual organizational process. The individual magnitudes of impact that each digital technology has on each individual organizational process is located at the intersection of the row and column associated with the individual digital technology and the individual organizational process. Other types of impacts are possible including, for example business values of impact, weighted values of impact, HR values of impact, sales values of impact, customer satisfaction values of impact, regulatory values of impact, timing values of impact, expense values of impact, risk values of impact, legal values of impact, reputational values of impact, or other types of impact.

Figure 8:
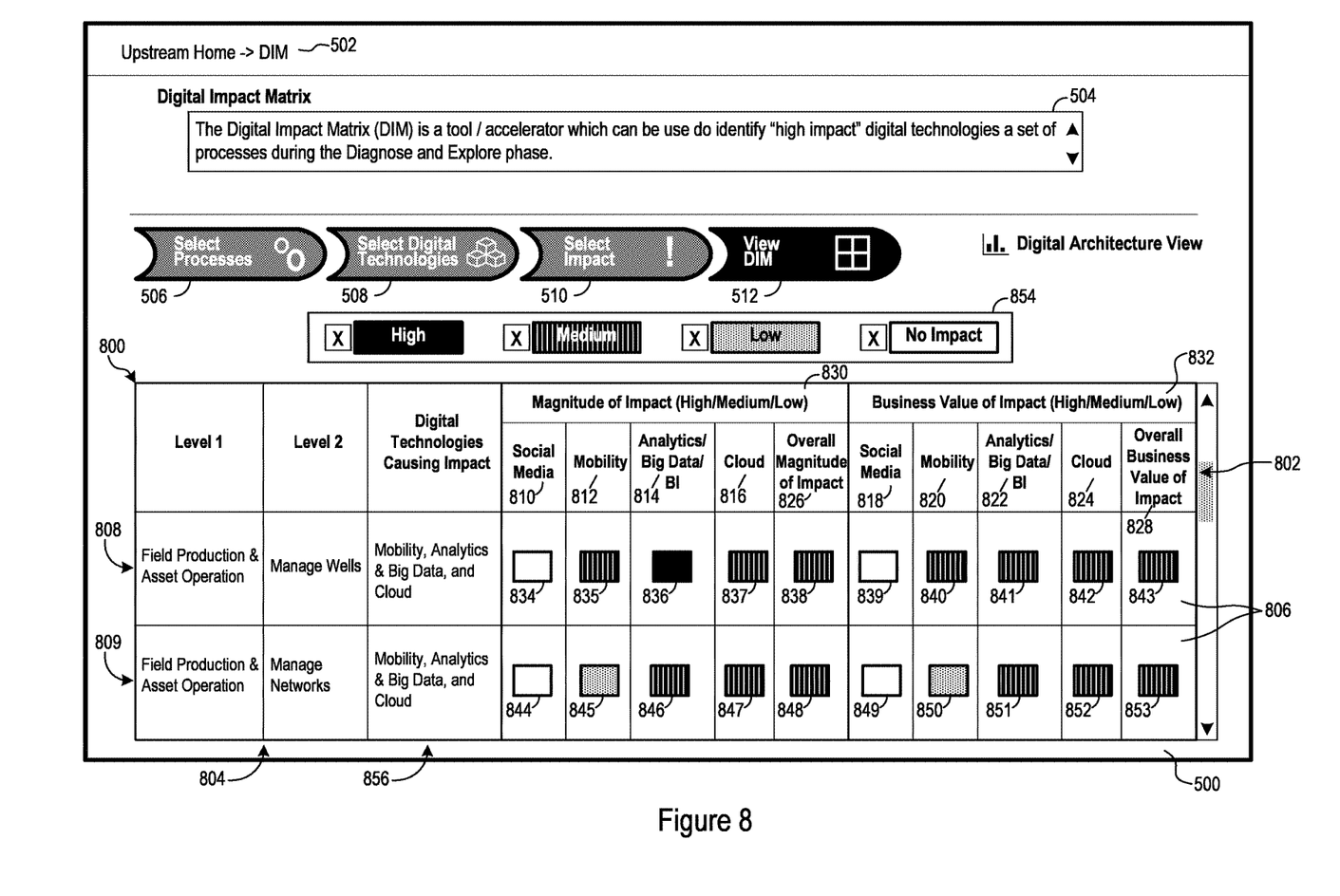
FIG. 8 shows another variation of the example graphical user interface of FIG. 5, illustrating a graphical representation of a digital impact matrix.

Turning briefly to FIG. 8, a graphical representation of a digital impact matrix 800 is illustrated. Across the top of the DIM 800 are the various digital technologies 802 representing the multiple columns of the DIM 800 in this embodiment. Down the left side of the DIM 800 are a plurality of organizational processes 804 (named in accordance with various organizational logical levels), which represent the multiple rows of the DIM 800. Each intersection of a row and column is an element 806. Each element 806, in turn, can include or store a value, represented in this embodiment as a plurality of impact categorizations (e.g., high, medium, low, and/or no impact). For example, the intersection of the first digital technology 810 ("Social Media") and the first organizational process 808 ("Field Production & Asset Operation: Manage Wells") includes an impact categorization 834 indicating that the digital technology of social media will have no impact (e.g., no magnitude of impact) on the first organizational process 808. However, the intersection of the second digital technology 812 ("Mobility") with the first organizational process 808 includes an impact categorization 835 indicating that the digital technology of Mobility 812 will have a medium impact (e.g., medium magnitude of impact) on the first organizational process 808.

Returning to FIG. 3, in accordance with various embodiments, the DIM generation circuitry 102 repeats portions of this process to generate a second matrix. Like the first matrix, the second matrix places the set of organizational processes against the set of digital technologies. However, the individual elements of the second matrix may collectively store a plurality of impacts that are different than the types of impacts stored in the first matrix. For example, the second matrix may store a plurality of business values of impact, which measure the business value of impact that an individual digital technology will have on an individual organizational process. Other type of impact may be possible for the second matrix, as are listed above with respect to the types that may be possible for the first matrix.

With brief reference again to FIG. 8, the illustrated DIM 800 includes examples of the first matrix 830 ("Magnitude of Impact") and the second matrix 832 ("Business Value of Impact") adjacent thereto. Other configurations are possible.

Returning to FIG. 3, the user interface circuitry 104 can provide a user interface to assign impact categorizations to the magnitudes of impact in the first matrix (310). Similarly, the user interface circuitry 104 can also provide a user interface to assign the impact categorizations to the business values of impact in the second matrix (310). In various embodiments, subject matter experts may make the plurality of assignments via the user interface and via the client device 120 or another device. In other embodiments, the DIM generation circuitry 102 provides suggestions for assignments of the impact categorizations and/or auto-populates the first matrix and second matrix with impact categorizations. The assignments may be suggested or auto-populated based on industry-specific or industry-generic historical data as to the impact of digital technologies on organizational processes, collective subject matter expert knowledge, or other sources. In various embodiments, discussed further below, the assignments may be preloaded into a digital impact matrix template as may be stored in the template matrices database 110. A subject matter expert or another user may have an opportunity to verify and/or modify assignments of impact categorizations for each element (e.g., intersection) of the DIM as may pertain to a particular business organization.

Once the user interface circuitry 104 receives the assignments and/or any modifications or verifications thereof, the user interface circuitry 104 can return the assignments to the DIM generation circuitry 102. The DIM generation circuitry 102 can then incorporate the received assignments into the first matrix and the second matrix. After that, the user interface circuitry 104 can once more provide and/or effect display of a graphical representation of the first matrix and the second matrix (together forming the digital impact matrix, in various embodiments) including the assignments (312). The graphical representation (e.g., DIM 800 in FIG. 8) may be provided to remote client device 120 or to a local display 220. The process of editing and displaying the DIM (including the first and second matrices) may be iteratively completed until a final DIM is completed, stored (e.g., in DIM storage database 112), and/or implemented.

With the graphical representation of the DIM, business organizations and business planners are apprised of various impacts that implementation of particular digital technologies will have on various organizational processes in a format that clearly and quickly provides indications as to areas of high impact and low impact. For example, in one embodiment, business organizations and planners may be apprised of the magnitudes of impact and/or business values of impact that implementation of particular digital technologies will have on various organizational processes. This enables the business organizations to carefully select which digital technologies to implement or which organizational processes to digitize in order to maximize business value.

In an alternative embodiment, the DIM generation circuitry 102 may create standard industry digital impact matrices that measure the impact of common digital technologies (e.g., common for that particular industry or generally common in the business world) on common organizational processes associated with the industry (e.g., the industry of energy production). These standard industry DIMs may be stored as template DIMs within the template matrices database 110 or elsewhere. To create the standard industry DIMs, the DIM generation circuitry 102 may receive a set or list of standard industry processes and/or a standard industry Logical Organizational Model (LOM) that dictates a set of organizational processes that are implemented by many or a majority of organizations within an industry (e.g., energy production, aircraft manufacturing, etc.) or are otherwise considered standard or common amongst organizations within that industry. This set of standard industry processes may be received in much the same manner was discussed with respect to step 302, above. Similarly, the DIM generation circuitry 102 may also receive a set of common digital technologies, which may also be received in a similar manner as was discussed with respect to step 304, above.

To generate a standard industry DIM, the DIM generation circuitry 102 may generate the first matrix and the second matrix, as discussed above with respect to steps 306 and 308. The user interface circuitry may provide an interface to enable a subject matter expert to assign impact categorizations to the multiple impacts (e.g., magnitudes of impact in the first matrix and/or business values of impact in the second matrix). The subject matter expert may make these assignments based on known, understood, calculated, and/or estimated levels of impact that each digital technology may have on each standard industry process. Once completed, the standard industry DIM can be stored as a template DIM in the template matrices database 110 for later use or later editing.

FIG. 4 shows a flow diagram of additional logic 400 that the machine 100 may implement to generate a digital impact matrix or to perform other processes. The DIM generation circuitry 102 and/or the user interface circuitry 104 may be configured to implement some or all of the logic 400 shown in FIG. 4. The logic 400 may be implemented along with or separate from the logic 300 of FIG. 3. To make use of the standard industry DIMs stored in the template matrices database 110, the DIM generation circuitry 102 may determine a template matrix to utilize in the creation of an DIM specific to a particular business organization (402). For example, the DIM generation circuitry 102 may search through the template matrices database 110 to find a standard industry template DIM that matches the industry of the particular business organization. For example, if the particular business organization is in the energy production industry, then an energy production standard industry template DIM may be appropriately selected and received. A subject matter expert or other user may select a different and/or related template DIM, if desired.

After the template matrix is selected, the DIM generation circuitry 102 may update or alter the template matrix with a set of organizational processes that are particular to that specific organization (404). These organization-specific processes may be determined or received in step 302 in FIG. 3. For example, various organizational processes included in the template DIM can be removed if not implemented by the particular organization, and other organizational processes can be added. Similarly, the DIM generation circuitry 102 may update or alter the template matrix with a set of possible digital technologies that the particular organization could implement or may wish to evaluate (406). This set of digital technologies may be determined or received in step 304 in FIG. 3. For example, various digital technologies included in the template DIM can be removed if not needed, and other digital technologies can be added. Accordingly, when using the template matrix as a starting place, the new DIM, including the first matrix (e.g., magnitude of impact) and/or the second matrix (e.g., business value of impact), can be created quicker. Further, in some embodiments, if the template DIM includes impact categorizations previously assigned (e.g., indicating the common or known impacts of digital technologies on the standard industry organizational processes), these previously-assigned impact categorizations can be implemented in the newly formed organization-specific DIM.

In certain embodiments, a user or subject matter expert may validate and/or alter assignments of impact categorizations (408). In one approach, this validation can be based on a set of organizational priorities that are known by the user or subject matter expert. The validation and/or altering can be of impact assignments carried over from a template DIM or new impact assignments made in a previous step. For example, in the energy production industry, if the business organization has previously identified that a strategic value driver is geographic expansion, then the user or subject matter expert will understand that the back office Human Resource (HR) needs are very important (e.g., driven by a need to hire in multiple countries, manage travel and visas, etc.). Thus, a digital technology solution (e.g., cloud services) implemented for HR back office organizational processes will have a higher business value to the particular business organization (e.g., a business value of "high"

should be assigned to the intersection of HR back office processes and the digital technology of cloud services). In this example, the impact categorization assigned in a template DIM or a previously-assigned business value impact categorization may only have a "medium" categorization, and thus the subject matter expert may alter the assignment for that element to "high." Thus, a user or subject matter expert with knowledge of the impacts of digital technologies on standard industry organizational processes, along with a knowledge of the needs, goals, and/or strategic drivers of a particular organization, can easily validate and/or alter the DIM for that particular organization to help select various digital technologies to implement and/or to help select which organizational processes to digitize. This validation and/or modification can be achieved via the user interface provided to the user on the client device 120 or local display 220.

As discussed above, impact categorizations may be discrete categories (e.g., high, medium, low, and/or no impact), may be values (e.g., a range from 1-10, 0-100, or any other appropriate numerical range), or may be based on another categorization method. In certain embodiments, discrete categories (e.g., high, medium, low, and/or no impact) may correspond to ranges of numerical values or weights that can be assigned. For example, a category of high may correspond to a weight or value greater or equal to 80 (out of 100), while medium may correspond to a value between 50 and 80, and low may correspond to a value below 50. These numerical values and weightings can be validated and/or altered by a user (410), which may influence the impact categorization assignments within the DIM.

In certain embodiments, the DIM generation circuitry 102 may generate an aggregated impact (e.g., aggregated magnitude of impact) for at least two different digital technologies corresponding to a single organizational process (412). Similarly, in some embodiments, the DIM generation circuitry 102 may generate a second aggregated impact (e.g., aggregated business value of impact) for at least two different digital technologies corresponding to a single organizational process (414). This is illustrated in the example DIM 800 of FIG. 8. In this example, the Overall Magnitude of Impact column 826 is an aggregation of the magnitude of impact for the digital technologies corresponding to an organizational process. For example, the impact categorization at 838 (Overall Magnitude of Impact for organizational process 808) is an aggregation of the impact categorizations 834-837 corresponding to organizational process 808. Similarly, in this example, the Overall Business Value of Impact column 828 is an aggregation of the business values of impact for the digital technologies corresponding to an organizational process. For example, the impact categorization at 843 (Overall Business Value of Impact for organizational process 808) is an aggregation of the impact categorizations 839-842 corresponding to organizational process 808.

The aggregation may be performed by the DIM generation circuitry 102 and may be an average, weighted average, sum, or other relationship that takes into account the individual impact categorizations assigned to two or more digital technologies on a single organizational process. In other embodiments, a user or subject matter expert may verify, modify, and/or select the aggregated impact(s) (e.g., an aggregated magnitude of impact or aggregated business value of impact).

Similarly, the DIM generation circuitry 102 may generate an aggregated impact (e.g., aggregated magnitude of impact and/or business value of impact) for at least two different organizational processes corresponding to a single digital technology. These vertical aggregations will show which digital technologies will have the greatest overall impact across all or some of the various processes.

Returning to FIG. 4, in another embodiment, the DIM generation circuitry 102 may determine at least one candidate organizational process to digitize or at least one candidate digital technology to implement based on the DIM (416). For example, the DIM generation circuitry 102 may generate a list of one or more candidate processes to digitize or candidate digital technologies to implement. The list may include the digital technologies with the highest impacts (e.g., magnitudes of impact and/or business values of impact) for one, some, or all organizational processes. Similarly, the list may include the organizational processes with the highest impacts (e.g., magnitudes of impact and/or business values of impact) with digital technologies applied thereto. The user interface circuitry 104 may effect display of the list on a client device 120 or local display 220. In another embodiment, the DIM generation circuitry 102, or another element or computing device, may automatically effect implementation of the candidate digital technologies and/or digitization of the candidate organizational processes.

In certain embodiments, the user interface circuitry 104 may receive a plurality of assignments for the impact categorizations within the DIM from a user input device (e.g., I/O device 222 or a similar I/O device on client device 120) (418). In such a manner, a user may make selections for various impact categorizations within the DIM.

In certain embodiments, the user interface circuitry 104 may provide an interface, such as a graphical user interface (GUI) including a graphical representation of the DIM (including the first matrix and the second matrix) to a remote client device 120 via the networks 116 (e.g., the Internet) (420). FIGS. 5-8 illustrate various examples and variations of a graphical user interface (GUI) 500 as may be provided by the user interface circuitry 104. The GUI 500 may provide an interface to enable a user or subject matter expert to interface with the machine 100 to cause a DIM to be created by the machine 100.

Figure 5:
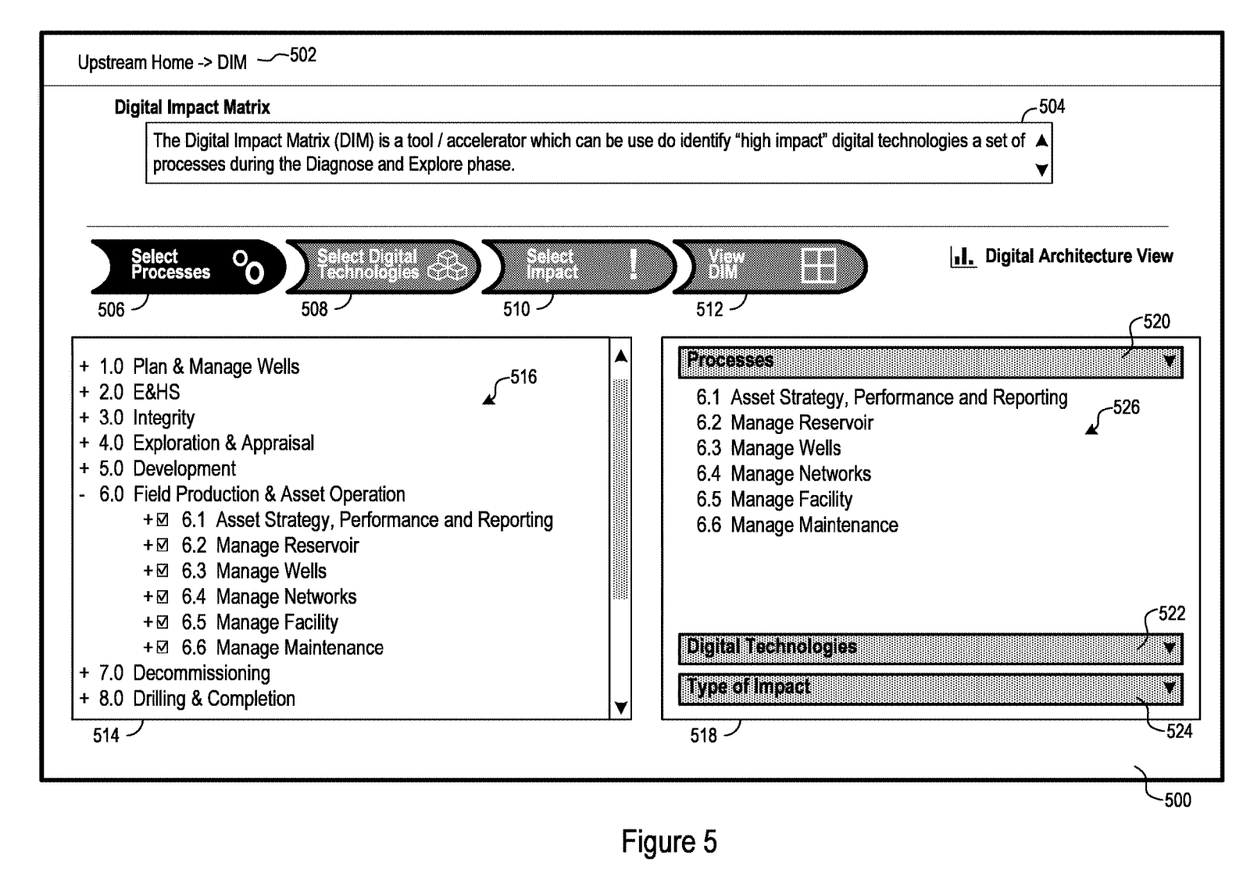
FIG. 5 shows an example graphical user interface as may be provided by the machine of FIG. 1.

FIG. 5 shows an example of the GUI 500. The GUI 500 may be provided as a part or portion of a larger software tool or service offering, for example, as may be part of an inward or outward facing business modeling software tool that is used to analyze business organizations and provide or implement recommended changes or updates to improve the operations of a business organization. The GUI 500 may be displayed on a client device 120 or locally via a local display 220. The GUI 500 may be implemented via a web browser operating on the client device 120 and may be display and/or navigated as a web page. Alternatively, the GUI 500 may be implemented as a stand-alone or interconnected software application running on the client device 120.

The GUI 500 may include a navigation bar 502, here showing the user that they have navigated to a Digital Impact Matrix portion of the tool. The GUI 500 may display a brief description 504 of the DIM to orient the user. The GUI 500 may show multiple status buttons or indicators illustrating which step of a DIM generation process the user is presently in. For example, the "Select Processes" indicator 506 is highlighted (being the first step in this example), while the "Select Digital Technologies" indicator 508, the "Select Impact" indicator 510, and the "View DIM" indicator 512 are not highlighted. As the user progresses through the steps, the different indicators may become highlighted indicating which step the user is currently on. Alternatively, the user may click on one or more of the indicators to jump to that particular step in the process.

In one embodiment, the first step of the DIM generation process is to select processes for the DIM. As is shown in FIG. 5, a selector pane 514 provides a list 516 of selectable organizational processes. The list 516 may be expandable and may be arranged by various levels of the organization. In one approach, the list 516 is arranged according to a LOM for the particular organization and/or the particular standard industry (e.g., energy production). To the right is a feedback pane 518 that provides a record of the selected items from the selector pane 514. For example, the feedback pane 518 may include multiple tabs corresponding to the different selections that are made as part of the process of creating the DIM. The feedback pane 518 may include a "Processes" tab 520, a "Digital Technologies" tab 522 and a "Type of Impact" tab 524, under which each tab shows the selected elements for that particular selection. For example, under the "Processes" tab (which corresponds to the "Select Processes" indicator 506 and process selection step shown in FIG. 5), a list 526 of selected processes is shown. The list 526 of selected processes corresponds to the selected processes of the list 516 in the selector pane 514.

Figure 6:
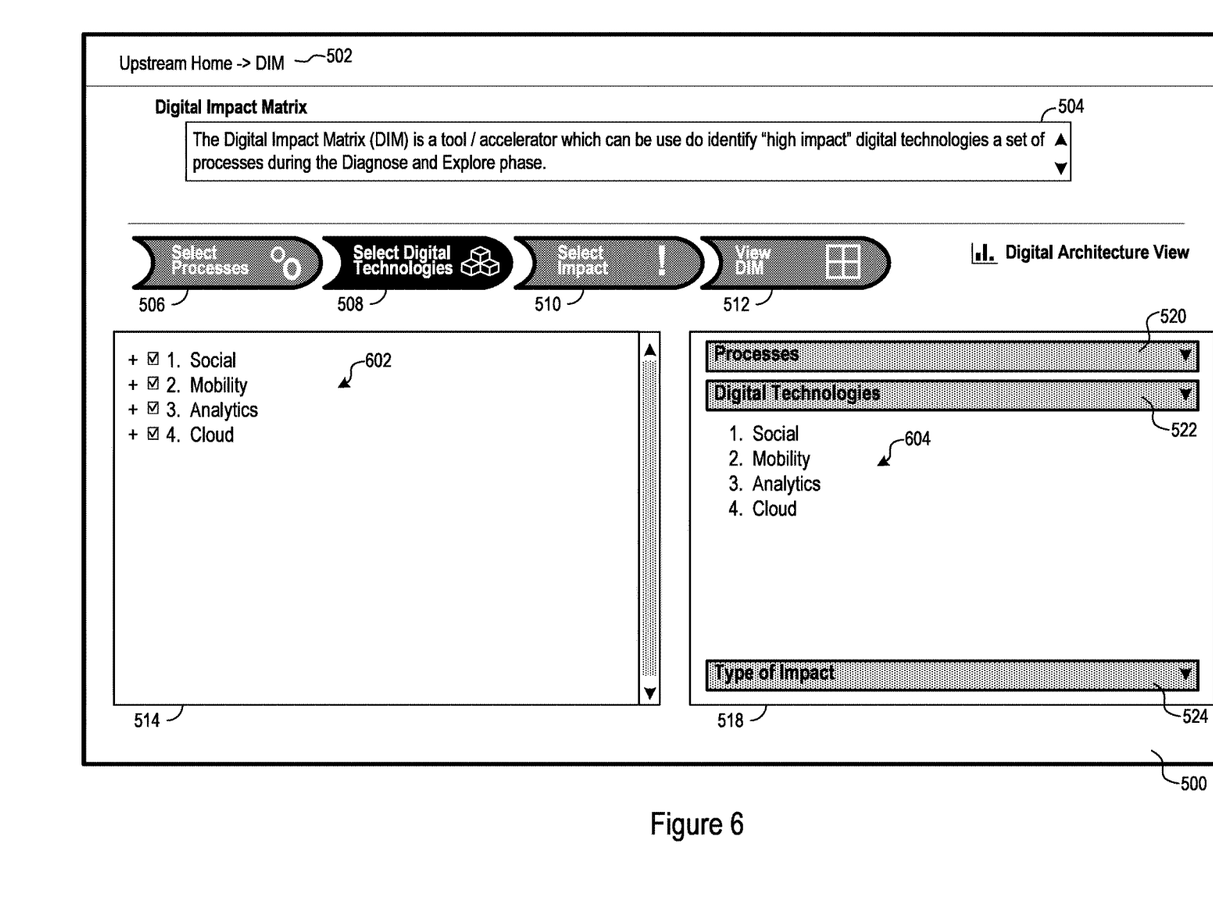
FIG. 6 shows a variation of the example graphical user interface of FIG. 5.

The next step is illustrated in FIG. 6, in which the GUI 500 has the "Select Digital Technologies" indicator 508 highlighted. In this step, the GUI 500 provides an interface for the user to select digital technologies from a list 602 provided in the selector pane 514. Likewise, under the "Digital Technologies" tab 522 in the feedback pane 518, a list 604 of the selected digital technologies from the list 602 is shown (listed here as Social, Mobility, Analytics, and Cloud, though other digital technologies may be possible and are contemplated by this disclosure).

Figure 7:
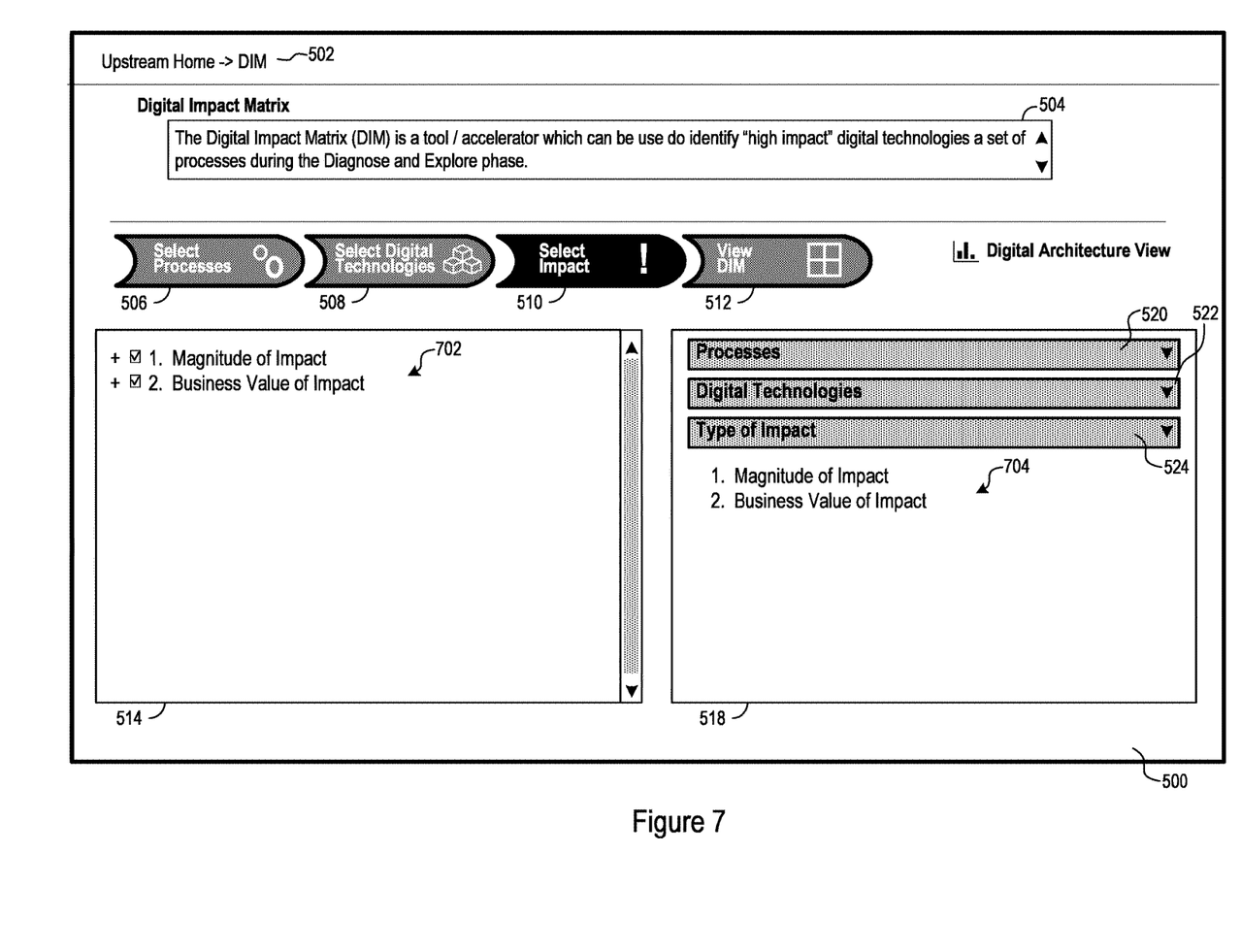
FIG. 7 shows another variation of the example graphical user interface of FIG. 5.

FIG. 7 shows the next step in which the GUI 500 has the "Select Impact" indicator 510 highlighted. In this step, the GUI 500 provides an interface for the user to select types of impacts to analyze and present in the resulting DIM. A list 702 of possible impact types is provided in the selector pane 514. Likewise, under the "Type of Impact" tab 524 in the feedback pane 518, a list 704 of the selected impact types from the list 702 is shown. In this example, the possible impact types are Magnitude of Impact and Business Value of Impact, though other additional impact types may be possible and are contemplated by this disclosure, some of which are discussed above.

FIG. 8 shows a step in which the GUI 500 graphically provides the generated digital impact matrix (DIM) 800. On the left side are a plurality of organizational processes 804 that correspond to the list of processes 526 shown and selected in FIG. 5. For example, a first organizational process 808 labelled "Field Production & Asset Operation: Manage Wells" and a second organization process 809 labelled "Field Production & Asset Operation: Manage Networks" are shown. Only two are shown in this example, but other organizational processes 804 may be displayable if scrolled or if displayed on a larger screen or with smaller scale. The organizational processes 804 may be labelled according to organizational levels (e.g., Level 1, Level 2), in various embodiments.

On the top side are a plurality of digital technologies 802 that correspond to the list of digital technologies 604 shown and selected in FIG. 6. Four digital technologies are shown in this example, including Social Media 810, Mobility 812, Analytics/Big Data/BI 814, and Cloud 816. The same four digital technologies are repeated again at 818, 820, 822, and 824, respectively. They are repeated to provide a second matrix as part of the DIM 800, as is discussed below.

Aggregated impacts are provided at 826 ("Overall Magnitude of Impact") and at 828 ("Overall Business Value of Impact"), which aggregated values were discussed above.

The DIM 800 includes a first matrix 830 and a second matrix 832. In this example, the first matrix 830 corresponds to the first impact type (Magnitude of Impact) as was shown in the list of types of impact 704 shown and selected in FIG. 7, while the second matrix 832 corresponds to the second impact type (Business Value of Impact). The first matrix 830 and the second matrix 832 are shown side-by-side and together form the DIM 800. In certain embodiments, a DIM may be formed with only one matrix, or more than two matrices depending on the number and types of impacts selected. In essence, the additional matrices convert the DIM into a multi-dimensional (beyond two dimensions) matrix that can be readily displayed and understood on a two-dimensional display.

The GUI 500 provides the graphical representation of the DIM 800 with a plurality of elements 806 (e.g., boxes) that correspond to each intersection of each organizational process 804 with each digital technology 802. A plurality of impact categorizations 834-853 are provided, each individually corresponding to a single element 806 of the DIM 800. An impact categorization key 854 is provided that relates the particular graphically displayed physical characteristics of the impact characterization (e.g., color, shade, shape, size, symbol, etc.) to its corresponding category (e.g., high, medium, low, and/or no impact). A user may enable or disable display of the different impact categories with a checkbox located adjacent to each impact characterization key element. In one embodiment, colors are used to distinguish between the different impact categorizations (e.g., red for high, yellow for medium, green for low, and white/clear for no impact, though many variations are possible). Conversely or additionally, the impact categorizations 834-853 could be replaced or augmented with numerical values, letters, or words (e.g., "5", "H", or "High").

In one approach, the GUI 500 may provide the ability for a user or subject matter expert to alter the impact categorizations 834-853 assigned to each element 806. In one approach, a user may click on or select an individual impact categorization (e.g., 834) and change its assigned impact categorization. For example, the user may change the assigned impact categorization 834 from "no impact" to "medium", for example, by dropping and dragging the particular type down from the key 854 to effect the new assignment, by selecting the new assignment from a drop-down or pop-up menu, by right-clicking and selecting a new assignment, by simply clicking on it until it changes to the desired new assignment (e.g., in a repeating revolving pattern), by entering a new numerical value or letter, or by any other methods that enable a user to change assignments or values of individual impact characterizations.

A summary column 856 provides list of digital technologies that affect each organizational process 804. The individual elements of the summary column 856 may change based on the impact characterizations corresponding to each digital technology for that particular organizational process 804. The GUI 500 may provide a user or subject matter expert with an ability to save the DIM 800 once they have completed viewing, validating, and/or editing the DIM 800.

So configured, a digital impact matrix is generated and provided that can help business organizations understand the impact of implementing digital technologies on its multiple organizational processes. Similarly, the digital impact matrix can help business organizations prioritize which digital technologies have a high impact on strategically important organizational processes. With the generation of a digital impact matrix, a business organization can easily and confidently select which digital technologies to implement or which organizational process to digitize with knowledge of how such implementation will affect multiple organizational processes, both in terms of a magnitude of impact as well as a business value of impact. The embodiments disclosed herein, while generally applicable across many different industries, may be particularly useful in the energy production industry, oil/gas resource industry, and the natural resource industry.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A machine comprising:
a processor, the processor configured to:
determine a set of organizational processes executed by an organization;
determine a set of digital technologies that is utilized by the organization; and
generate a first matrix of the set of organizational processes against the set of digital technologies, wherein the first matrix stores a plurality of impacts of individual ones of the digital technologies on individual ones of the set of organizational processes;
user interface circuitry coupled to the processor, the user interface circuitry configured to:
provide a user interface to assign a plurality of impact categorizations to the plurality of impacts of the first matrix; and
provide the plurality of impact categorizations to the processor;
the processor further configured to incorporate the plurality of impact categorizations into the first matrix; and
the user interface circuitry further configured to effect display of a graphical representation of the first matrix incorporating the plurality of impact categorizations.

2. The machine of claim 1 wherein the processor is further configured to:
generate the first matrix, wherein the first matrix stores a plurality of magnitudes of impact of individual ones of the digital technologies on individual ones of the set of organizational processes; and
generate a second matrix of the set of organizational processes against the set of digital technologies, wherein the second matrix stores a plurality of business values of impact of individual ones of the digital technologies on individual ones of the set of organizational processes;
wherein the user interface circuitry is further configured to provide the user interface to assign the plurality of impact categorizations to the plurality of magnitudes of impact of the first matrix and the plurality of business values of impact of the second matrix;
wherein the processor is further configured to incorporate the plurality of impact categorizations into the first matrix and the second matrix; and
the user interface circuitry further configured to effect display of a graphical representation of the first matrix and the second matrix incorporating the plurality of impact categorizations.

3. The machine of claim 1 wherein the user interface circuitry is further configured to provide the user interface to assign the plurality of impact categorizations selected from the group comprising high, medium, or low.

4. The machine of claim 3 wherein the processor is further configured to receive a validation of the weightages of the high, medium, and low impact categorizations.

5. The machine of claim 1 wherein the processor is further configured to receive a validation of the assignment of the plurality of impact categorizations based on a set of organizational priorities.

6. The machine of claim 1 wherein the processor is further configured to generate an aggregated impact corresponding to at least two impacts for at least two different digital technologies corresponding to a single organizational process.

7. The machine of claim 1 further comprising communication interface circuitry coupled to an Internet, wherein the communication interface circuitry is configured to provide the user interface and provide the graphical representation of the first matrix via the internet to a remote client device.

8. The machine of claim 1 wherein the processor is further configured to:
determine a template matrix from a plurality of template matrices;
generate the first matrix using the template matrix by:
updating the template matrix with the set of organizational processes executed by the organization; and
updating the template matrix with the set of digital technologies that is utilized by the organization.

9. The machine of claim 1 wherein the processor is further configured to:
determine at least one candidate organizational process to digitize or at least one candidate digital technology to implement based on the first matrix.

10. A method comprising:
determining, by a processing device, a set of organizational processes executed by an organization;
determining, by a processing device, a set of digital technologies that is utilized by the organization;
generating, by the processing device, a first matrix of the set of organizational processes against the set of digital technologies, wherein the first matrix stores a plurality of impacts of individual ones of the digital technologies on individual ones of the set of organizational processes;
providing an interface, by the processing device, to assign a plurality of impact categorizations to the plurality of impacts of the first matrix; and
providing, via a display device, a graphical representation of the first matrix.

11. The method of claim 10 further comprising:
generating, by the processing device, the first matrix, wherein the first matrix stores a plurality of magnitudes of impact of the individual ones of the digital technologies on the individual ones of the set of organizational processes;
generating, by the processing device, a second matrix of the set of organizational processes against the set of digital technologies, wherein the second matrix stores a plurality of business values of impact of individual ones of the digital technologies on individual ones of the set of organizational processes;
providing the interface, by the processing device, to assign the plurality of impact categorizations to the plurality of magnitudes of impact of the first matrix and the plurality of business values of impact of the second matrix; and
providing, via a display device, a graphical representation of the first matrix and the second matrix.

12. The method of claim 10 further comprising receiving a plurality of assignments of the plurality of impact categorizations, entered via a user input, for the plurality of impacts of the first matrix.

13. The method of claim 10 wherein individual ones of the plurality of the impact categorizations comprise a categorization selected from the group comprising high, medium, or low, the method further comprising validating the weightages of the high, medium, and low categorizations.

14. The method of claim 10 further comprising validating the assignment of the plurality of impact categorizations based on a set of organizational priorities.

15. The method of claim 10 further comprising generating, by the processing device, an aggregated impact corresponding to at least two impacts for at least two different digital technologies corresponding to a single organizational process.

16. The method of claim 10 further comprising providing the interface and providing the graphical representation of the first matrix via the internet to a remote client device.

17. The method of claim 10 further comprising:
determining a template matrix from a plurality of template matrices;
generating the first matrix using the template matrix by:
updating the template matrix with the set of organizational processes executed by the organization; and
updating the template matrix with the set of digital technologies that is utilized by the organization.

18. The method of claim 10 further comprising:
determining at least one candidate organizational process to digitize or at least one candidate digital technology to implement based on the first matrix.

19. A machine comprising:
communication interface circuitry;
user interface circuitry coupled to the communication interface circuitry, the user interface circuitry configured to provide a graphical user interface to a remote client device via the communication circuitry, the graphical user interface including a graphical representation of a digital impact matrix, the digital impact matrix comprising a first matrix and a second matrix;
a processor coupled to the user interface circuitry, the processor configured to:
determine a set of organizational processes executed by an organization;
determine a set of digital technologies that is utilized by the organization;
generate the first matrix of the digital impact matrix comprising the set of organizational processes against the set of digital technologies, wherein the first matrix stores a plurality of magnitudes of impact of individual ones of the digital technologies on individual ones of the set of organizational processes; and
generate the second matrix of the digital impact matrix comprising the set of organizational processes against the set of digital technologies, wherein the second matrix stores a plurality of business values of impact of individual ones of the digital technologies on individual ones of the set of organizational processes;
the user interface circuitry further configured to:
receive, from the remote client device via the communication interface circuitry, assignments of a plurality of impact categorizations to the plurality of magnitudes of impact of the first matrix and the plurality of business values of impact of the second matrix; and
provide the assignments to the processor;
the processor further configured to update the digital impact matrix with the assignments; and
the user interface circuitry further configured to provide a graphical representation of the updated digital impact matrix to the remote client device via the communication interface.

20. The machine of claim 19 wherein the processor is further configured to determine at least one candidate organizational process to digitize or at least one candidate digital technology to implement based on the first matrix and the second matrix; and     wherein the user interface circuitry is further configured to provide a graphical representation of the candidate organization process or the candidate digital technology to the client device via the communication interface.

\* \* \* \* \*